US006912272B2

(12) United States Patent
Kirk et al.

(10) Patent No.: US 6,912,272 B2
(45) Date of Patent: Jun. 28, 2005

(54) METHOD AND APPARATUS FOR MANAGING COMMUNICATIONS AND FOR CREATING COMMUNICATION ROUTING RULES

(75) Inventors: Julian P. Kirk, Radford, VA (US); Randal J. Kirk, Belspring, VA (US)

(73) Assignee: Talkflow Systems, LLC, Radford, VA (US)

( * ) Notice: Subject to any disclaimer, the term of this patent is extended or adjusted under 35 U.S.C. 154(b) by 257 days.

(21) Appl. No.: 09/956,990

(22) Filed: Sep. 21, 2001

(65) Prior Publication Data

US 2003/0059016 A1 Mar. 27, 2003

(51) Int. Cl.[7] .......................... H04M 1/64; H04M 3/42; H04M 3/00

(52) U.S. Cl. ................................ 379/88.01; 379/88.13; 379/88.19; 379/211.02; 379/212.01; 379/214.01; 379/265.01; 379/265.09; 379/265.12; 379/266.07

(58) Field of Search ........................... 379/88.01, 88.13, 379/88.19, 88.17, 88.2, 88.21, 211.02, 212.01, 214.01, 265.01, 265.05, 265.09, 265.12, 265.13, 266.07, 266.08

(56) References Cited

U.S. PATENT DOCUMENTS 4,420,656 A 12/1983 Freeman
4,591,664 A 5/1986 Freeman
4,788,718 A 11/1988 McNabb et al.
4,894,857 A 1/1990 Szlam et al.
5,008,930 A 4/1991 Gawrys et al.
5,012,512 A 4/1991 Basso et al.
5,027,384 A 6/1991 Morganstein
5,042,667 A 8/1991 Keough
5,048,079 A 9/1991 Harrington et al.
5,101,425 A 3/1992 Darland et al.
5,146,490 A 9/1992 Beckman
5,159,698 A 10/1992 Harrington et al.
5,164,981 A 11/1992 Mitchell et al.
5,179,585 A 1/1993 MacMillan, Jr. et al.
5,185,780 A 2/1993 Leggett
5,206,903 A 4/1993 Kohler et al.
5,210,789 A 5/1993 Jeffus et al.
5,230,017 A 7/1993 Alexander
5,303,298 A 4/1994 Morganstein et al.
5,333,183 A 7/1994 Herbert
5,410,589 A 4/1995 Galligan
5,452,350 A 9/1995 Reynolds et al.
5,479,487 A 12/1995 Hammond
5,479,491 A 12/1995 Herrero Garcia et al.
5,506,890 A 4/1996 Gupta et al.
5,528,676 A 6/1996 Sussell et al.
5,535,256 A 7/1996 Maloney et al.
5,555,299 A 9/1996 Maloney et al.
5,581,604 A 12/1996 Robinson et al.
5,592,541 A 1/1997 Fleischer, III et al.
5,655,015 A 8/1997 Walsh et al.
5,666,401 A 9/1997 Morganstein et al.
5,684,863 A 11/1997 Katz (Continued)

FOREIGN PATENT DOCUMENTS

EP 0 500 180 A1 8/1992

OTHER PUBLICATIONS

PCT International Search Report dated Apr. 21, 2003 (PCT/US02/29216.

*Primary Examiner*—Allan Hoosain
(74) *Attorney, Agent, or Firm*—Hunton & Williams LLP

(57) ABSTRACT

A method and apparatus for managing communication, such as telephone calls. One or more of a plurality of predetermined values are assigned to each of one or more of a plurality of predetermined characteristics relating to a received communication. A destination is selected based on the assigned values and the communication is routed to the selected destination. Scripts can be generated to route the communication to a specified device of the destination.

85 Claims, 12 Drawing Sheets

U.S. PATENT DOCUMENTS

| | | | | | |
|---|---|---|---|---|---|
| 5,684,868 | A | | 11/1997 | Alexander | |
| 5,696,811 | A | | 12/1997 | Maloney et al. | |
| 5,715,307 | A | | 2/1998 | Zazzera | |
| 5,740,233 | A | | 4/1998 | Cave et al. | |
| 5,754,634 | A | | 5/1998 | Kay et al. | |
| 5,757,904 | A | * | 5/1998 | Anderson | 379/265 |
| 5,768,360 | A | | 6/1998 | Reynolds et al. | |
| 5,774,534 | A | * | 6/1998 | Mayer | 379/142.01 |
| 5,787,153 | A | | 7/1998 | Bankay et al. | |
| 5,799,073 | A | | 8/1998 | Fleischer, III et al. | |
| 5,818,907 | A | | 10/1998 | Maloney et al. | |
| 5,818,908 | A | | 10/1998 | Kaplan | |
| 5,822,401 | A | | 10/1998 | Cave et al. | |
| 5,825,856 | A | | 10/1998 | Porter et al. | |
| 5,854,832 | A | | 12/1998 | Dezonno | |
| 5,854,837 | A | | 12/1998 | Trader et al. | |
| 5,870,455 | A | | 2/1999 | Campbell et al. | |
| 5,896,445 | A | | 4/1999 | Kay et al. | |
| 5,915,010 | A | * | 6/1999 | McCalmont | 379/212 |
| 5,946,375 | A | | 8/1999 | Pattison et al. | |
| 5,946,386 | A | | 8/1999 | Rogers et al. | |
| 5,949,869 | A | | 9/1999 | Sink et al. | |
| 5,982,863 | A | | 11/1999 | Smiley et al. | |

| | | | | | |
|---|---|---|---|---|---|
| 5,987,115 | A | | 11/1999 | Petrunka et al. | |
| 5,999,604 | A | | 12/1999 | Walter | |
| 6,016,336 | A | | 1/2000 | Hanson | |
| 6,038,293 | A | | 3/2000 | McNerney et al. | |
| 6,058,163 | A | | 5/2000 | Pattison et al. | |
| 6,058,179 | A | | 5/2000 | Shaffer et al. | |
| 6,061,433 | A | | 5/2000 | Polcyn et al. | |
| 6,070,142 | A | | 5/2000 | McDonough et al. | |
| 6,072,864 | A | * | 6/2000 | Shtivelman et al. | 379/210 |
| 6,088,444 | A | | 7/2000 | Walker et al. | |
| 6,091,805 | A | | 7/2000 | Watson | |
| 6,104,786 | A | | 8/2000 | Gibilisco et al. | |
| 6,124,561 | A | | 9/2000 | Luckhurst et al. | |
| 6,134,530 | A | | 10/2000 | Bunting et al. | |
| 6,144,971 | A | | 11/2000 | Sunderman et al. | |
| 6,148,074 | A | | 11/2000 | Miloslavsky et al. | |
| 6,269,153 | B1 | * | 7/2001 | Carpenter et al. | 379/88.02 |
| 6,314,177 | B1 | * | 11/2001 | Davis et al. | 379/265.12 |
| 6,316,741 | B1 | | 11/2001 | Fitzgibbons et al. | |
| 6,404,876 | B1 | * | 6/2002 | Smith et al. | 379/218.01 |
| 6,526,126 | B1 | * | 2/2003 | Morganstein et al. | 379/88.02 |
| 6,603,847 | B1 | * | 8/2003 | Griffith | 379/211.02 |

* cited by examiner

METHOD AND APPARATUS FOR MANAGING COMMUNICATIONS AND FOR CREATING COMMUNICATION ROUTING RULES

BACKGROUND OF THE INVENTION

1. Field of the Invention

The invention relates generally to management of telecommunications calls and more specifically to a method and apparatus for routing and managing telecommunications calls and for developing rules for accomplishing the same.

2. Description of the Related Art

Various telecommunications systems are used to manage incoming and outgoing communications in every imaginable type of business, government entity, institution, and even private residences in some cases. In recent years, these entities have experienced massive increases in the volume of such communications. Further, the market pressures for efficiency have increased the importance of handling telecommunications calls efficiently with minimized labor costs. Computer telephone integration (CTI) systems have been developed to automate and manage the process of handling calls. CTI systems can be passive or active.

When a caller calls a typical passive CTI system, the system accesses caller information contained in an automatic number identification (ANI), Caller ID system or dialed number information service (DNIS), and directs the call based on the caller identification information. If the caller is new to the CTI system, the information contained in ANI, Caller ID, or DNIS might not be sufficient to direct the call. Also, some callers direct the phone company to block transfer of ANI, Caller ID, or DNIS information and thus typical CTI systems are not helpful in such a situation.

Even when a CTI system can access the appropriate caller identification information, the CTI databases can only function after a caller calls several times using the same number or the caller is otherwise entered into the database. This may help the system direct the call in the future; however, it is often the case that a caller will desire different services, information, or relationships from a particular entity on different calls. For example, the caller may call about purchasing products one day, servicing products at a later time, and returning products at even a later time. In this case, directing the calls based on caller information and corresponding rules relating to prior use will only frustrate the caller.

Typical active CTI systems use automated menus to interact with the caller in order to determine the proper destination for the call. These menus operate by prompting the user to answer questions with responses that correspond with keys on the telephone, i.e. dual tone multi-frequency (DTMF) signals, to navigate a tree structure. This often requires the user to enter a personal identification number (PIN). Also, some systems use interactive voice response (IVR), or a voice response unit (VRU) to collect information from the caller. IVR and VRU typically collect short statements by the caller, i.e. the CTI system will prompt the user by asking the caller to "press or say five" to reach a particular department. IVR and VRU systems generally are incapable of handling anything more than a single number, a series of numbers, or a short phrase that corresponds with an expected caller response. If a caller needs particular assistance that does not correspond with the pre-programmed system, the caller is forced to wade through the automated system until they are able to reach a human operator to assist them. This also often results in frustration on the part of the caller.

Compared to the speed and flexibility of the human mind, these types of response systems are tedious and inaccurate, and thus often frustrating for the user. For a new caller, it may take several minutes before the caller is connected to a recipient and this recipient may not be the appropriate person for helping the caller. If a caller is unfamiliar with the system or particular entity they are calling, the caller may not know which department or area is best suited to receive their call. Also, the caller is not likely to make the correct decision when navigating through the DTMF/IVR/VRU system because either the caller cannot determine a match between the menu choices and their current issue or the caller will intentionally misclassify their call to try to obtain a faster response. Users are known to repetitively press a button, such as zero (0), because they know this will likely direct the system to transfer the call to a human operator with which many users feel comfortable.

Because of the limitations of existing systems, most businesses have a reception function that operates autonomously. The reception function provides little organizational knowledge of the identity of callers and how calls are directed, other than the knowledge base retainer in the mind of the receptionist. Of course, even this information is lost if the receptionist leaves the job or takes a vacation.

For the foregoing reasons, there is a need for a method and system of telecommunications management that will quickly and accurately direct a call to a call recipient particularly equipped to handle a call based on the subject matter, i.e. content, of the call. In particular, there is a need for a method and system that integrates the problem-solving capabilities of the human mind and the desirability for human social interaction with the reduced labor costs, computational capabilities, and processing capabilities associated with typical CTI systems. Further, it would be desirable to permit callers to use their own words to facilitate classification of a call by another human as opposed to imposing a predefined set of menus on the caller.

SUMMARY OF THE INVENTION

A first aspect of the invention is a method for managing communications comprising the steps of receiving a communication, assigning one or more of a plurality of predetermined values to each of one or more of a plurality of predetermined characteristics relating to the communication, selecting a destination based on the values assigned in the assigning step, and transferring the communication to the destination.

A second aspect of the invention is a method for classifying a communication comprising analyzing the content of the communication, applying the content of the communication to a characteristic matrix, assigning a predetermined value to each characteristic in the matrix classifying the communication based on the structure of the matrix.

A third aspect of the invention is computer readable media having instructions recorded thereon for managing communications, the instructions comprising instructions for prompting a user to assign one or more of a plurality of predetermined values to each of one or more of a plurality of predetermined characteristics relating to a received communication, instructions for selecting a destination based on the values assigned in the assigning step, and instructions for transferring the communication to the call destination. A fourth aspect of the invention is a method of managing communications comprising ascertaining the meaning of at least a portion of the communication, applying a translational language to the meaning, selecting a destination based on the results of the applying step, and transferring the communication to the destination.

BRIEF DESCRIPTION OF THE DRAWINGS

The invention is described below through a preferred embodiment and the attached drawing in which.

DETAILED DESCRIPTION OF THE PREFERRED EMBODIMENT

The preferred embodiment draws on concepts of "computational linguistics" to route calls. In computational linguistics, the formal techniques of computational models of intelligence are applied to the study of human linguistics. The ability to categorize parts of phrases to select a specific overall meaning from the constituent parts of the phrases or sentences seems to be uniquely characteristic of human behavior. The continuous refinement and redefinition of what role a word plays in our environment, and how we conceptualize that word having different properties in different contexts is known as the process of "cocomposition."

All words are ambiguous to some extent. Even words that appear to have one fixed sense can exhibit multiple meanings in different contexts. 'Room', for example, can mean a physical object or the spatial enclosure defined by this object. The conceptual relation between two senses of the same word is referred to as "logical polysemy." Further, the concept of "metonymy," in which a figure of speech involving the substitution of one noun for another of which it is an attribute or which is closely associated with it, renders language highly complex and difficult to understand. Examples of metonymy are "the pot boils" or "he drank the mug." Computational linguistics has lead to the concept of "translational equivalence" in which accepted relationships between source and target language expressions are accepted as valid translations of one another. "Translational languages" utilize translational equivalence to provide algorithms for translating one language expression to another language expression.

Because language is highly complex and the full understanding of language is uniquely human, previous attempts to automate the management and routing of communications, such as telecommunications calls have failed to understand the content, i.e. the subject matter, of the communication and thus cannot accurately direct a call based on content. While speech recognition engines and the like are well known, the processing power required to utilize computational linguistics and to interpret human conversation would be extremely high if not completely unobtainable.

Figure 1:
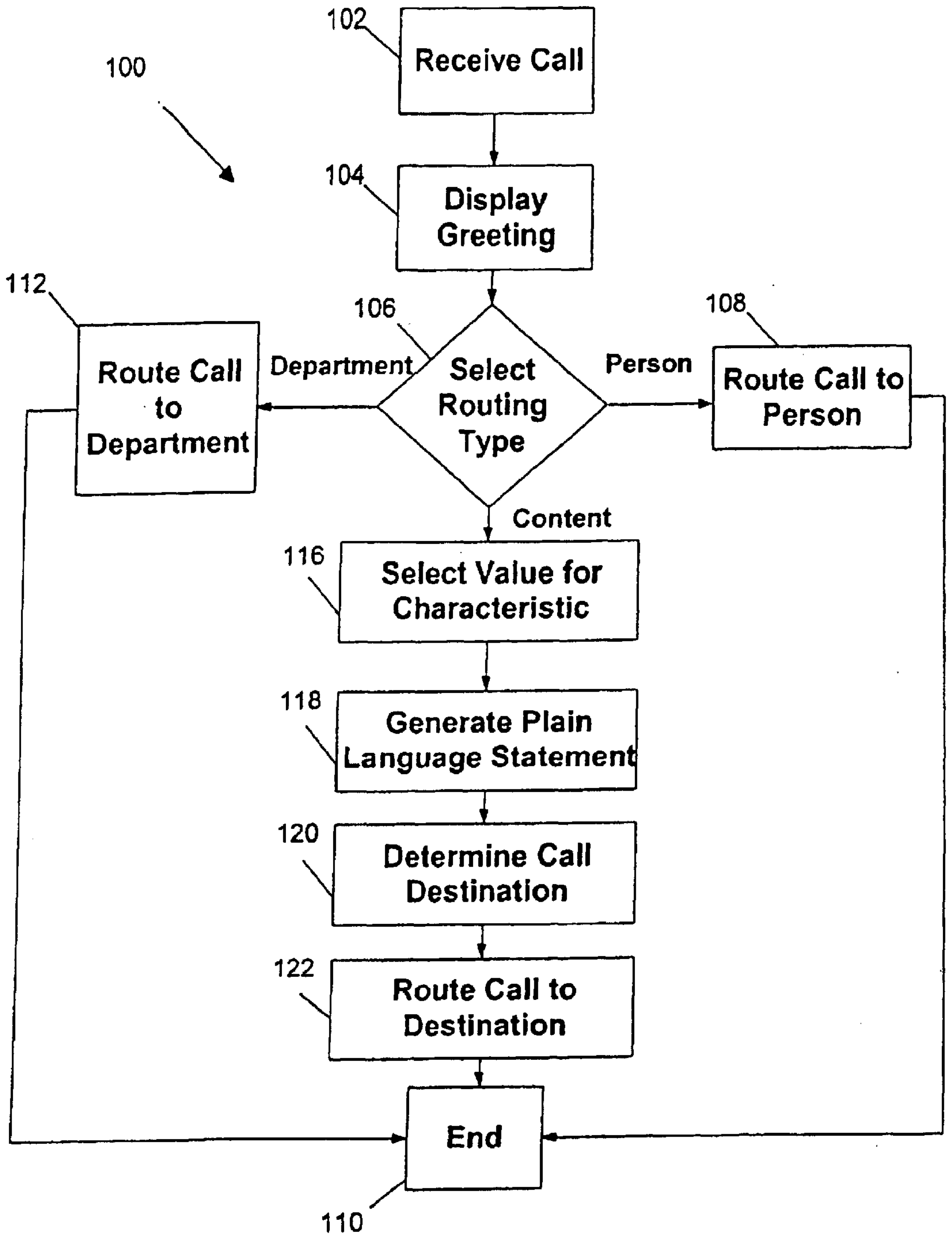
FIG. 1 is a flowchart of a call management method of the preferred embodiment.

The preferred embodiment of the invention facilitates determination of the content of a communication by a human operator with minimal need for training by providing a translation language and a mechanism for using the translational language to determine the content of a communication and thus manage the communication. A method of managing communications in accordance with a preferred embodiment of the invention is illustrated in FIG. 1. The preferred embodiment relates to management telephone calls and can be utilized within any type of organization, i.e. any entity handling calls, such as a business, government institution, call handling service provider, or the like. Method 100 begins at step 102 in which a call is received by any designated person or persons, hereinafter referred to as a "receptionist." In the preferred embodiment, the call is placed in a conventional manner, via the Public Switched Telephone Network (PSTN) for example. However, the call can be of any type placed through any communications medium, such as a local area network, a wide area network, such as the Internet, or the like. Method 100 can be executed by a general purpose programmable computer, having a display and an input device, or by plural devices communicating over a network. For example, the preferred embodiment can be software running on a standalone computer or a network of computers in an enterprise environment.

Figure 2:
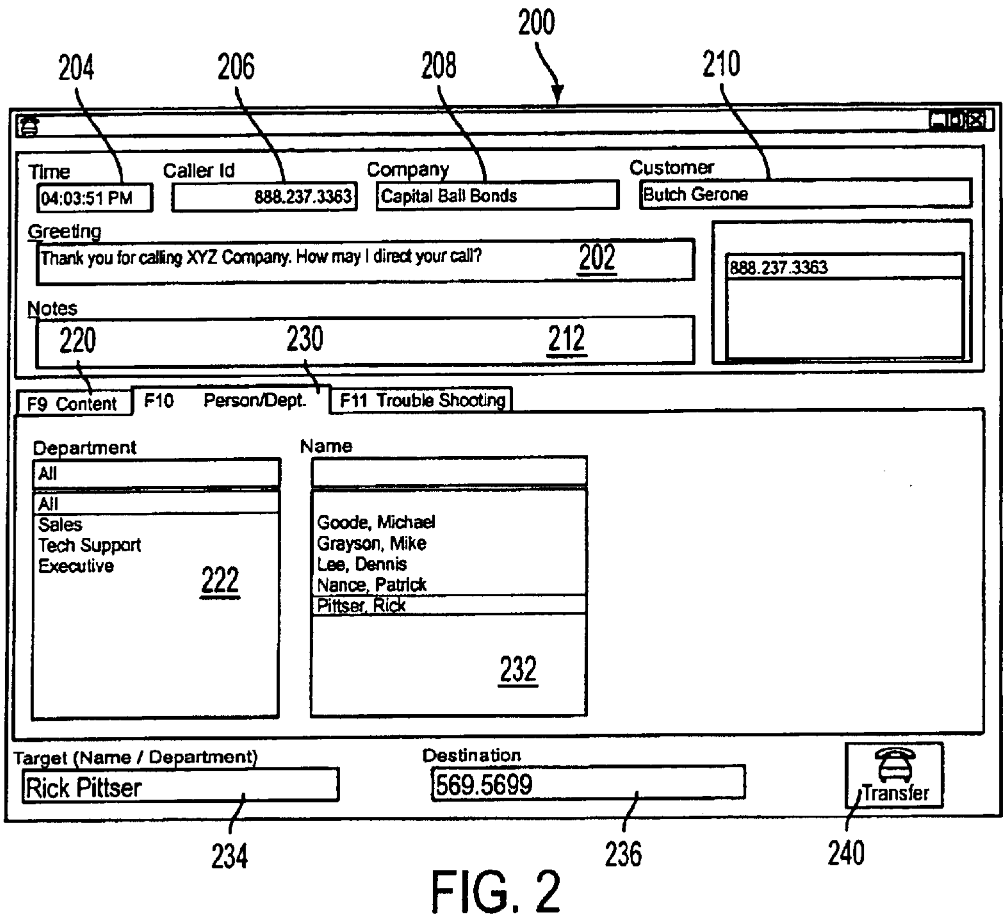
FIG. 2 is a call reception screen of the preferred embodiment.

When a communication, such as a telephone call, is received in step 102, a screen displays a desired greeting for the receptionist in step 104. FIG. 2 illustrates call reception screen 200 of the preferred embodiment. The greeting is displayed in field 202 and can be context sensitive. For example, the greeting can changed based on the time of day, caller ID information of the call originator, the identity of the receptionist, call recipient (in the case of a receptionist handling calls for plural divisions, departments, or companies), or other variables. Further, the greeting can include reference to products or services offered by the call recipient. As an example, the displayed greeting might be, "Good morning, XYZ Company, home of the finest service, how may I direct your call?" or some similar message. The receptionist need merely read the greeting displayed in field 202 upon answering the call to provide a consistent and appropriate greeting to all callers. Call reception screen 200 can also display various information about the call, such as the time of the call in field 204, the caller ID information in fields 206 and 208, the customer contact in field 210, and any notes about the customer in field 212. All of this information can be logged into a database and manipulated as needed. The information in fields 210 and 212 can be stored in a database and correlated to the caller ID information for display.

Note that call reception screen 200 also includes plural tabs for selecting a call routing type in step 106, including call content tab 220 and person/department tab 230. If, in response to the greeting recited by the receptionist, the caller, i.e. the call originator, asks to speak to a particular person or department, the receptionist will select person/department tab 230, using the input device and a standard user interface (UI), in step 106. In the case of the preferred embodiment, the standard Microsoft Windows™ UI is used. However, any appropriate UI can be used in connection with the invention.

If the caller requests a particular person, the person can be selected from the list of persons in field 232 of call reception screen 200 in step 106, the call will be routed, i.e. directed, to the selected person in step 108 when the receptionist selects transfer button 240, and the process ends in step 110. Similarly, If the caller requests a department, the desired department can be selected from the list of departments in field 222 of call reception screen 200 in step 106, the call will be routed to the department in step 112 when the receptionist selects transfer button 240, and the process ends in step 110.

Figure 3:
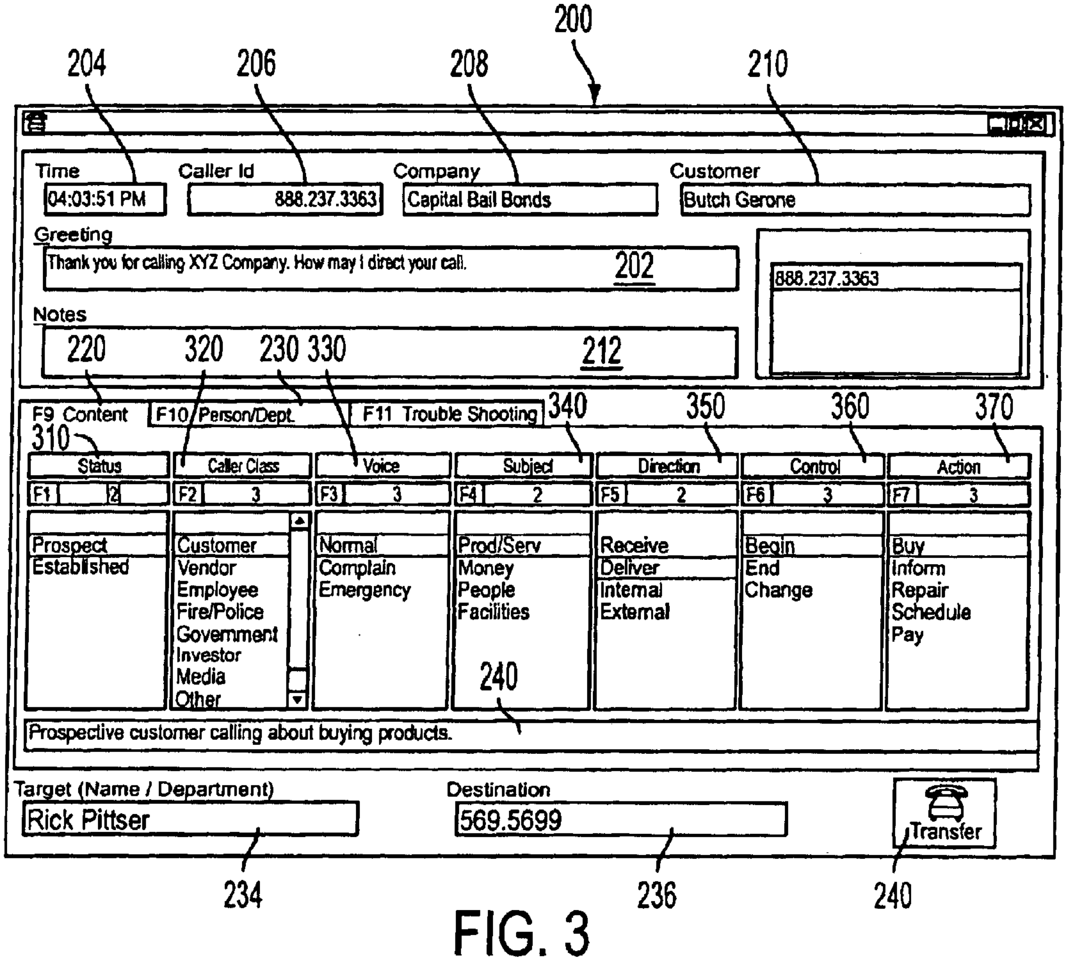
FIG. 3 is the content display of the call reception screen of FIG. 2.

On the other hand, if the caller fails to request a particular department or person, the receptionist selects content tab 220, using the input device, in step 106 to route the call based on the content of the call determined by values assigned to characteristics of the call. FIG. 3 illustrates call reception screen 200 when content tab 220 is selected. A plurality, seven in the preferred embodiment, of columns are displayed. Each of the columns represents a predefined call characteristic and includes a plurality of values that can be assigned to the corresponding characteristic. The receptionist can select the proper value for one or more of the characteristic in step 116 and the call can be routed based on the selected values and predefined rules as described in detail below. The values are selected based on the request of the caller. For example, a caller may say, "I am interested in purchasing the equipment listed on page 3 of your advertisement."

Column 310 relates to the customer status characteristic, and the potential values associated therewith are displayed in column 310. Table 1 below describes the meaning of each potential value in column 310.

TABLE 1

| Value | Meaning |
|---|---|
| Prospect | Caller is calling on behalf of an entity not having a previous relationship with the organization |
| Established | Caller is calling on behalf of an entity having an existing relationship with the organization. |

When selecting column 310, the receptionist can be prompted to ask "Do you have an account with us," or the like, Assuming the answer is "no," the receptionist will select "prospect" as the customer status from column 310 because the caller is calling on behalf of an entity not having an account, i.e. a previous relationship of a customer, vendor, or the like. Had the caller stated that he did have an account, the proper value for column 310 would be "established" because the call is on behalf of an established customer. Note that the selected value for the characteristic in the preferred embodiment relates to a previous relationship between the party on whose behalf the caller is making the call and the organization.

Column 320 corresponds to the caller class characteristic and the proper value in this case is "customer" because the caller is seeking to buy something based on the caller's initial comments. Table 2 below describes each potential value for column 320.

TABLE 2

| Value | Meaning |
|---|---|
| Customer | Caller is calling in the capacity of a customer |
| Vendor | Caller is calling in the capacity of a vendor |
| Employee | Caller is calling in capacity of employee or potential employee |
| Fire/Police/Rescue | Caller is calling in the capacity of emergency personnel (although not necessarily calling about an emergency situation) |
| Government | Caller is calling in the capacity of a government official |
| Investor | Caller is calling in the capacity of an investor or potential investor |
| Media | Caller is calling as a member of the media |
| Other | Caller is of a determined caller class other than those above |

Column 330 corresponds to the "voice" of the call and in this case should be assigned the value "normal" because the caller does not express any specific urgency. Had the caller stated that equipment was malfunctioning "complain" would be selected and had the caller indicated that the failure created an emergency situation, "emergency" could be selected. Table 3 below describes the potential values in column 330.

TABLE 3

| Value | Meaning |
|---|---|
| Normal | Call voice is normal, i.e. not exceptional |
| Complain | Call relates to a complaint (ordinarily given an elevated priority) |
| Emergency | Call relates to an emergency situation (ordinarily given a high priority) |

Column 340 relates to the subject, or target, of the call, which in this case is assigned the value "product/service" because the caller inquired about products. Table 4 below describes the meaning of potential values in column 340.

TABLE 4

| Value | Meaning |
|---|---|
| Product/Service | Call is about a product or service |
| Money | Call is about monetary issues |
| Facilities | Call is about facilities |
| People | Call is about a person or persons |

Column 350 relates to the transaction direction, i.e. the potential direction of the flow of goods or services or any other subject of the call and in this case is assigned the value of "going" because the equipment is potentially being sold, i.e., going out of the organization. Table 5 below describes the meaning of potential values in column 350.

TABLE 5

| Value | Meaning |
|---|---|
| Receive | Subject of call is coming into organization |
| Deliver | Subject of call is going out of organization |
| External | Subject of call is entirely out of the organization |
| Internal | Subject of call is entirely within organization |

Column 360 relates to the control of the transaction, i.e. start a new transaction, begin a transaction, or change a transaction. The term "transaction" as used herein refers to any exchange of information. In this case, the value "begin" is selected because the caller potentially wants to begin a new transaction, i.e. buying equipment. An example of a call which would be assigned the value of "end" would be a call in which a caller wants to cancel a purchase, lease, service, or the like. Similarly, a call in which the caller wishes to change a purchase, lease, service, or the like would be assigned the value "change." Table 6 below describes the meaning of potential values in column 360.

TABLE 6

| Value | Meaning |
|---|---|
| Begin | Call relates to beginning a new transaction |
| End | Call relates to ending a transaction |
| Change | Call relates to changing a transaction |

Finally, in the preferred embodiment, column 370 relates to the type of action contemplated by the caller. In this case, the value "buy" is assigned. Table 7 below describes the meaning of potential values for column 370.

TABLE 7

| Value | Meaning |
|---|---|
| Buy | Call is in reference to a financial transaction |
| Inform | Caller wants to report information to organization |
| Repair | Call relates to repair |
| Pay | Call relates to payment |
| Schedule | Call relates to scheduling an activity |

A receptionist would be able to assign values to all or most categories based on the opening statement from most callers with minimal training. In fact, a receptionist could be a call agent employed by a call center service that answers calls for a plurality of businesses and the categories and values displayed could vary based on the call destination, i.e. the business called by the call originator. Using links to other applications, such as order entry, order status, inventory, and the like, the call agent can handle a variety of issues and tasks with minimal training. Also, the rules described below can be unique for each business entity and can direct the receptionist to the various applications. Such a situation could be handled efficiently with minimal training because the techniques are similar for all calls regardless of the type of business that the call is related to. Of course, there can be any number of categories and corresponding values. Also, the categories and values can be predetermined based on the type of business, the organizational flow of the business, the number of employees, the division of work, and the like. The categories can relate to any characteristic of a potential call, and there can be any number or type of values for selection in each category. It can be seen that the values assigned to the categories are indicative of the subject matter or content of the call and thus can provide direction in routing the call.

In the example given above, the receptionist has assigned the value matrix, i.e. value list, of "Prospect/Customer/Normal/Product/Outgoing/Start/Buy" in order corresponding to the categories discussed above and illustrated in FIG. 3. This matrix is then "translated", in step 118, to generate a plain language statement displayed in field 240. The plain language statement assists the receptionist in understanding the nature of the call and can be logged and used later in reports. The plain language statement is generated based on the value matrix and predefined rules determined in the manner described in detail below. Should the receptionist not be able to determine each value based on the call originator's initial comments, the plain language statement will be generated based on the entered values and can serve to assist the receptionist in inquiring about further information that will help assign the proper values. Alternatively, the call may be routed based on the values entered even if not all values are entered as will become apparent below.

In step 120, the call destination is determined based on predefined rules as applied to the value matrix assigned to the call and the destination information is displayed in fields 234 (destination name) and 236 (destination number). The process for determining the rules is also described in detail below. The call destination can be a department, a person, a particular location or the like, depending on the business, the workflow, the business preferences, and other variables. In step 122, the receptionist can select transfer button 240 and the call will be routed in the corresponding manner. The process then ends in step 110 and the receptionist is ready to take another call in step 102.

As noted above, the content of a call is determined by assigning values to a plurality of characteristics thereby creating a value matrix, i.e. a list of selected values. A set of rules are then applied to the value matrix to route the call to a desired destination. The rules can be determined and recorded in any manner. However, the preferred embodiment provides a UI for assisting the user in creating and recording the rules. Of course, the rules are predetermined and thus do not need to be created over and over again. However, the rules can be changed, manually or automatically, to correct for inefficiencies or to compensate for changes in personnel, workflow, organization, or other variables. All call routing can be logged and calls that are not successfully routed can be analyzed to change the rules in an itemized manner.

Figure 4:
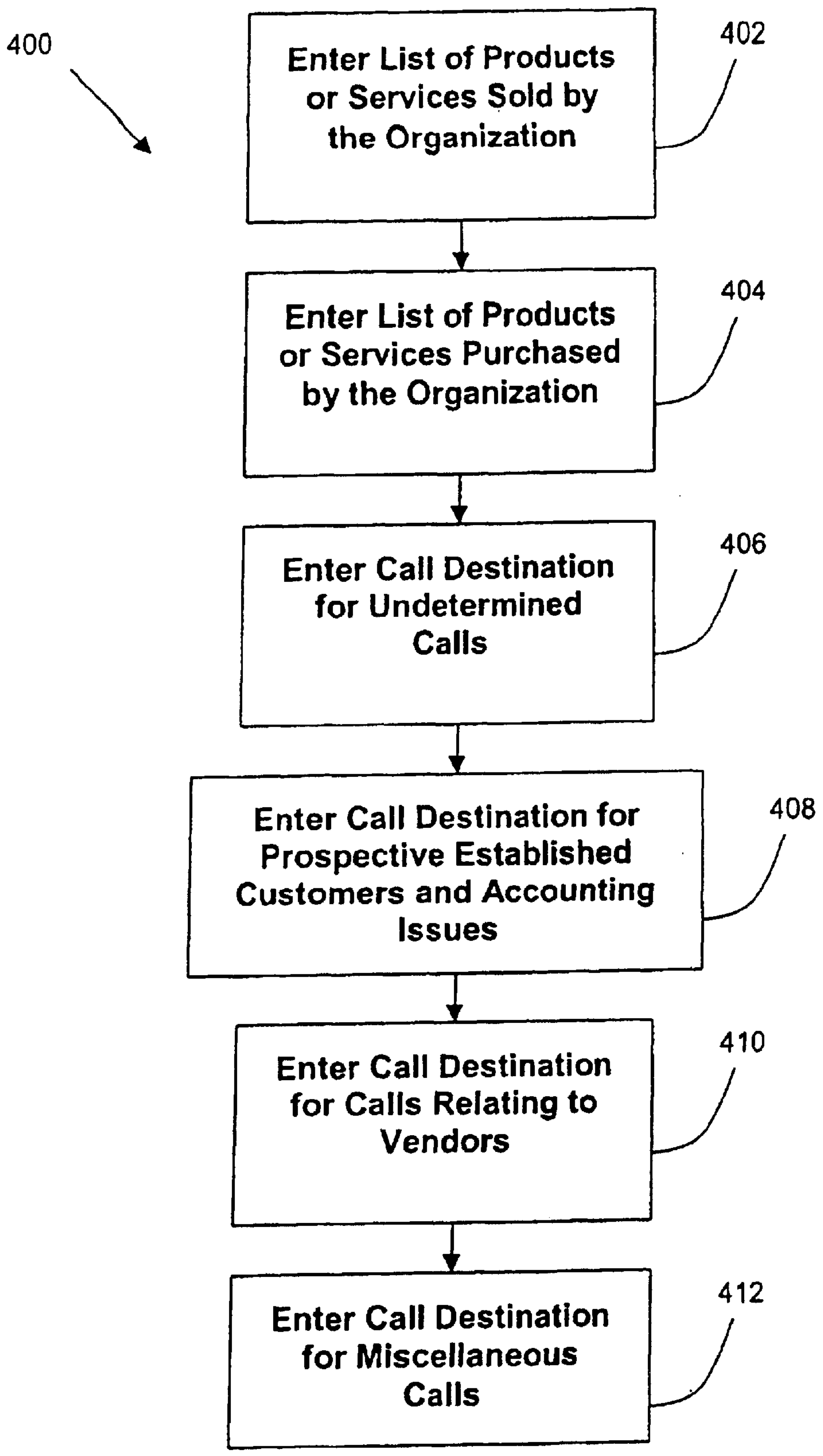
FIG. 4 is a flowchart of a routing rules determination method of the preferred embodiment.
Figure 5:
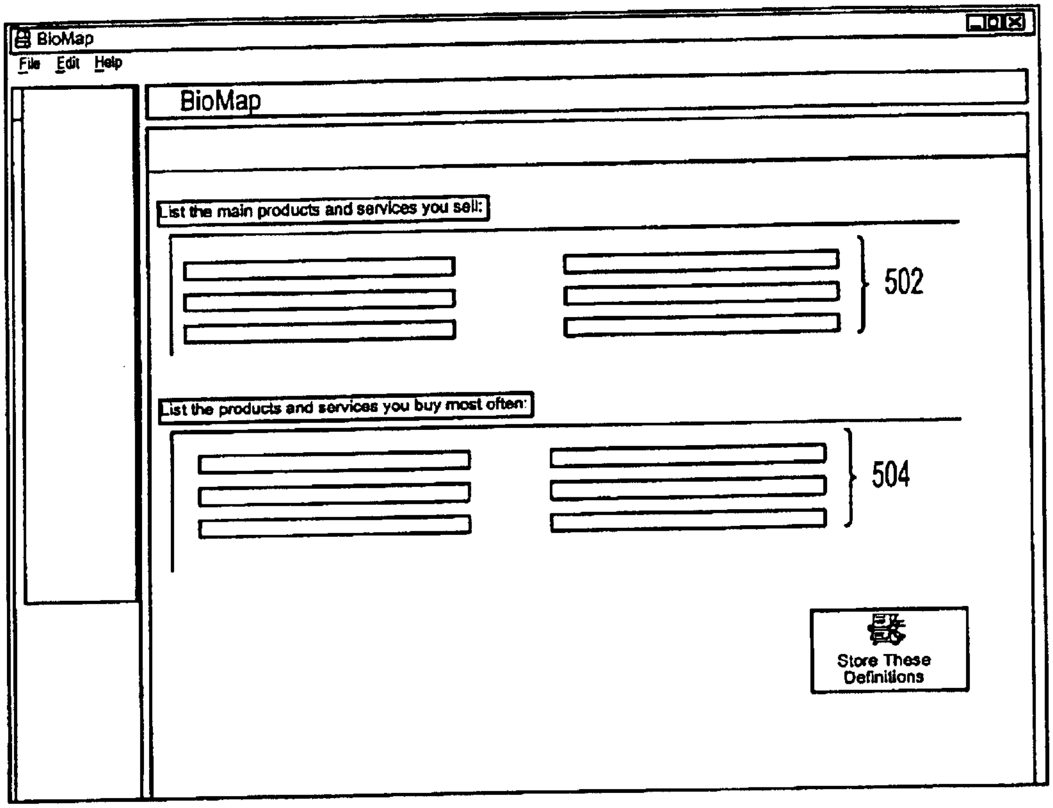
FIG. 5 is a data entry screen of the preferred embodiment.

FIG. 4 illustrates method 400 for assisting organizations in determining the routing rules in accordance with the preferred embodiment. Routing rules essentially define the translational equivalent of the translational language used in the preferred embodiment. The method of FIG. 4 can be implemented as a front end interface in the form of a "wizard" or the like. Actual routing rules can be determine din the manner discussed below. This method could utilize input from managers, sales personnel, consultants, human resources persons, or any other appropriate persons for supplying the appropriate information about the organization for which the routing rules are to be applied to calls. In step 402, the user enters a list of products and/or services sold by the organization. The list can include specific items or categories of items that have similar qualities. As an example, FIG. 5 illustrates a display screen of a general purpose programmable computer that can be utilized for prompting data entry in step 402. The user merely fills in fields 502 with names, part numbers, or other indications of the products or services using the input device. Most organizations will purchase as well as sell products or services. In step 404, the user enters a list of products and/or services purchased by the organization. The list can include specific items or categories of items that have similar characteristics. As an example, the user can fill in fields 504 with names, part numbers, or other indications of the products or services using the input device. Of course, all of the data can be recorded and used for creating the rules in the manner described below. For example, this date can be used to create additional characteristics or values based on differentiation between how calls for specific products or the like should be handled.

Regardless of the accuracy and completeness of the rules, there may always be certain calls that cannot be routed properly, i.e. a destination or matrix cannot be determined. This can occur because the call is highly unusual, because the receptionist made an error, or for various reasons. Accordingly, in step 406, a call default destination for such calls can be entered field 598 of FIG. 8 described in detail below.

Figure 6:
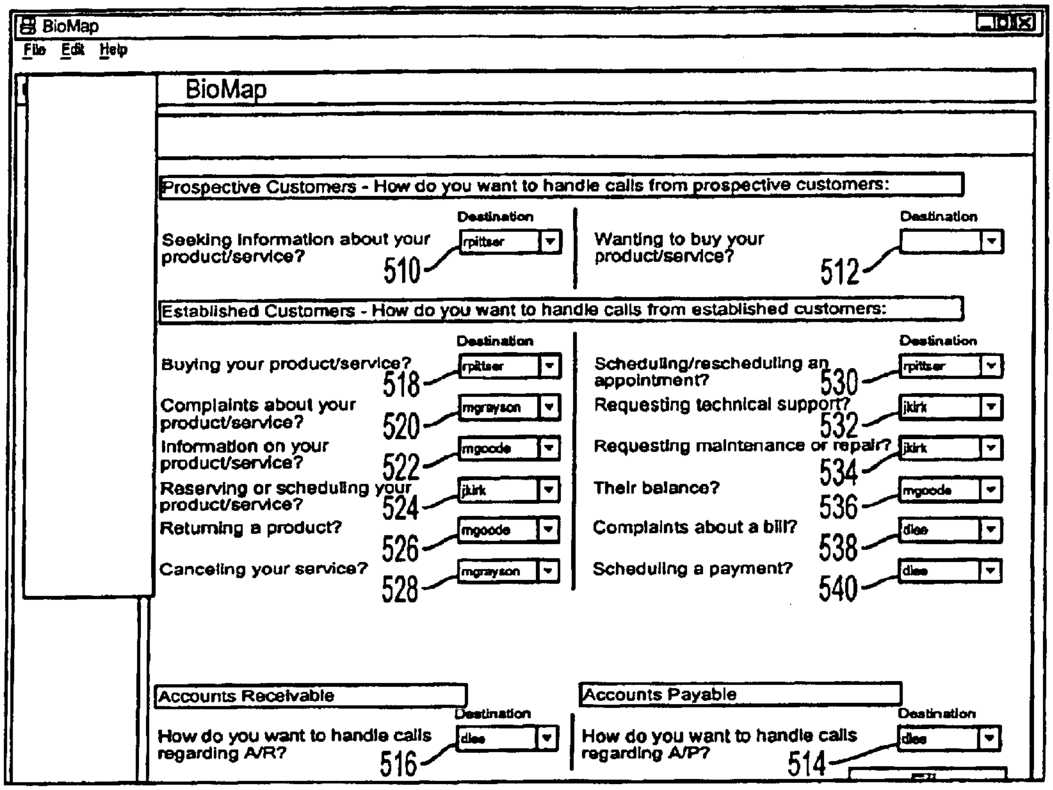
FIG. 6 is a destination assignment screen of the preferred embodiment.

In step 408, the user enters desired destinations for calls having content related to prospective customers, established customers, and accounting issues. Once again, a destination can be an individual, a department, a group, a location, or any other indication of where the call should be routed. Also, as will become apparent below, the destinations can include alternatives based on the time of day, availability of personnel, and other variables. As illustrated in FIG. 6, the destination for prospective customers seeking information about products or services can be entered in field 510, the destination for prospective customers inquiring about purchasing products or services can be entered in field 512, the destination for calls related to accounts payable matters can be entered in field 514, and the destination for calls related to accounts receivable matters can be entered in field 516. Keep in mind that the content of the call, i.e. the subject matter of the call will be determined by assigning values in the manner described above with reference to FIG. 1 and applying rules as described below.

Destinations for calls relating to established customer transactions are also entered in step 408. In the preferred embodiment, such calls are further segregated into subcategories such as purchasing products, complaints about products, returns and the like. For example, as illustrated in FIG. 6, fields 518 through 540 can be filled in to assign a destination for each subcategory of call content listed in the corresponding row.

Figure 7:
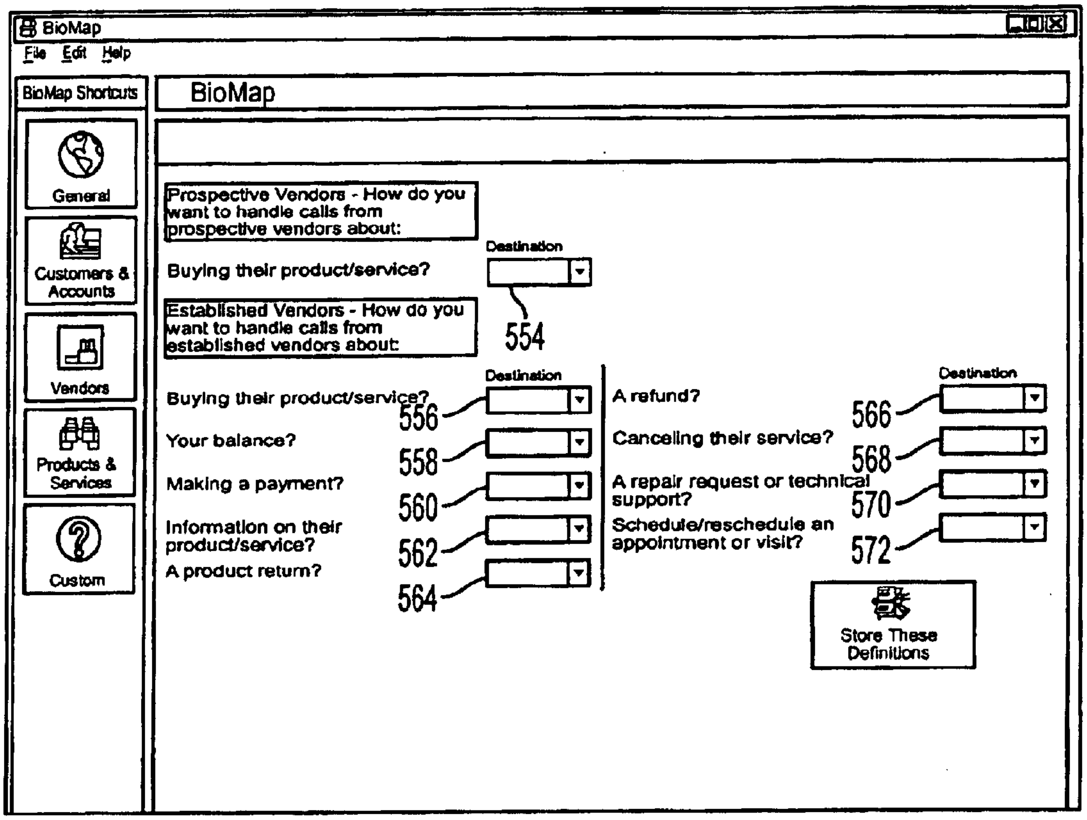
FIG. 7 is another destination assignment screen of the preferred embodiment.

In step 410, destinations for calls relating to prospective and established vendors are set. In the preferred embodiment, established vendor calls are further segregated into subcategories such as calls related to the organizations account balance, making a payment, and the like. For example, a screen for entering destinations relating to established customers is illustrated in FIG. 7. Fields 554 through 572 can be filled in to assign a destination for each subcategory of call content listed in the corresponding row.

Figure 8:
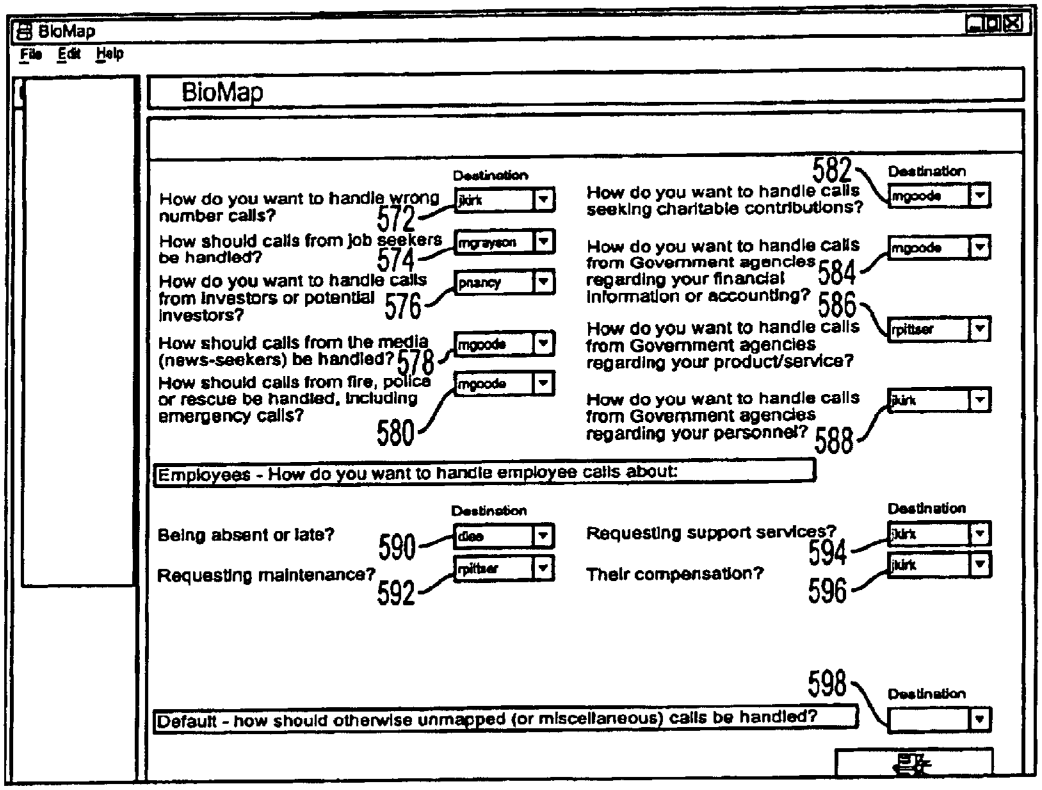
FIG. 8 is another destination assignment screen of the preferred embodiment.

In step 412, destinations for miscellaneous calls are set. In the preferred embodiment, miscellaneous calls are segregated into subcategories such as wrong numbers, employment inquiries, calls from media, calls from emergency personnel, and the like. For example, a screen for entering destinations relating to various miscellaneous calls is illustrated in FIG. 8. Fields 572 through 588 can be filled in to assign a destination for each category of call listed in the corresponding row. Also, destinations for employee originated calls can be entered in fields 590 through 596.

The call categories described above with respect to the preferred embodiment can be changed. For example there can be more categories, less categories, different categories and subcategories as is required by the organization and its business model, personnel, and the like. The categories and subcategories can be derived from the characteristics and values or vice versa. It will become apparent below that, in the preferred embodiment, each call subcategory and its assigned destination can correspond to at least one value matrix. Therefore, for each value matrix, a call mapping, i.e. assigned destination, exists. Rules can be fashioned in various ways depending on the business model, work flow, and other factors. Further, the destination can be a person, specific device, or a link to an application, such as an order entry application or an inventory application. In the case of the destination being a link, the receptionist is directed to the desired application by the appropriate rule.

Figure 9:
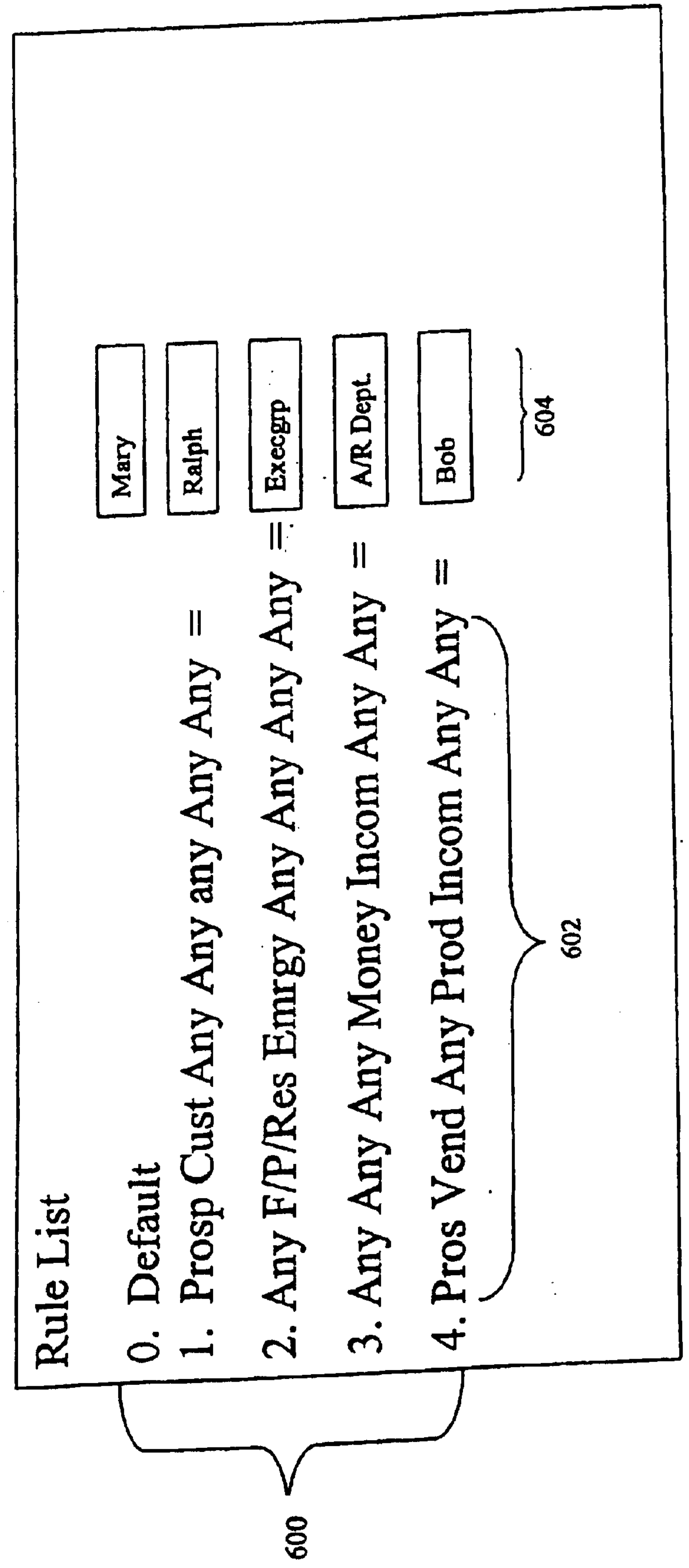
FIG. 9 illustrates a set of routing rules of the preferred embodiment.

FIG. 9 illustrates a small set of call routing rules that can be used for routing calls to destinations in step 122 of FIG. 1. In FIG. 9, there are 5 rules 600. Each rule has a value matrix 602 and a destination 604. Of course, the value matrix for any particular call can be determined in the manner described above with respect to FIG. 1. When routing a call, rules 600 are scanned to determine if any of rules 600 include a value matrix 602 that corresponds (i.e. is similar or identical) to the value matrix of the call as determined in step 116 of FIG. 1. If so, the call is routed to the destination 604 of the corresponding rule. Various algorithms can be used to determine which rule 602 if any most closely corresponds to any particular call. Of course, the rule set illustrated in FIG. 9 is only exemplary of a portion of a rule set. Actual rule sets, including those created using the preferred embodiment, can include many more rules. However, there is no minimum or maximum number of rules that can be used with the invention.

Figure 10:
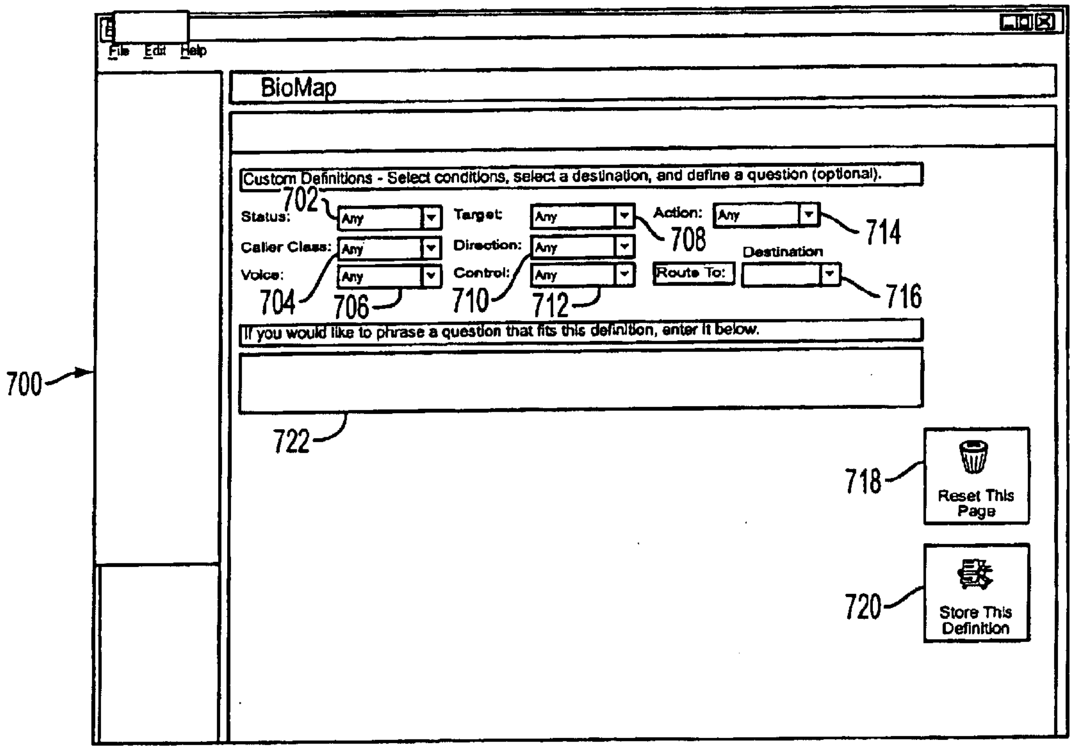
FIG. 10 is a rule configuration screen of the preferred embodiment.

To create a routing rule set, the preferred embodiment includes an algorithm, that can be executed on a general purpose computer, for correlating the destinations entered in steps 406 through 412 with potential value matrices that corresponded to the destination fields. Also, in the preferred embodiment, rules can be constructed manually. FIG. 10 illustrates custom rule configuration screen 700. Drop down menus 702 through 714 correspond respectively to the seven characteristic columns 310 through 370 illustrated in FIG. 3. Further, the user can select any one of the values associated with each characteristic through the associated drop down menu to create a value matrix 602 for a rule 600. Destination 604 to be associated with the selected value matrix can be selected through drop down menu 716. Further, if desired, a plain language statement to be associated with the value matrix can be entered into field 722 to be displayed in field 202 (FIG. 2) when the rule is applied. Selecting button 720 will store value matrix 602 with the selected mapped destination and any entered plain language statement as rule 600 for routing calls. Once again, rules 600 can be stored in any format, such as a lookup table, plain delimited text, or as any other type of database. All rules 600 can be displayed in the manner illustrated in FIG. 9 or in any other manner.

As noted above, rules can be used to route calls to a destination, which can be a person, department, group physical or virtual inbox, or any other entity. However, even when a call is routed to a particular person, that person may not be in the location anticipated, e.g. they may not be at their phone. Accordingly, the preferred embodiment provides for each destination to have one or more devices associated therewith. In the case of the destination being a person, the devices can be the person's first phone number, a second phone number, voicemail, a pager, a mobile phone, or the like. In the case of a department or a group, devices can be various devices in the group, such as a first person's phone number, a second person's phone number and the like. Calls can be directed to the various devices based on the destination's schedule, e.g. hours in office, hours commuting to office, hours in meetings, and the like.

Figure 11:
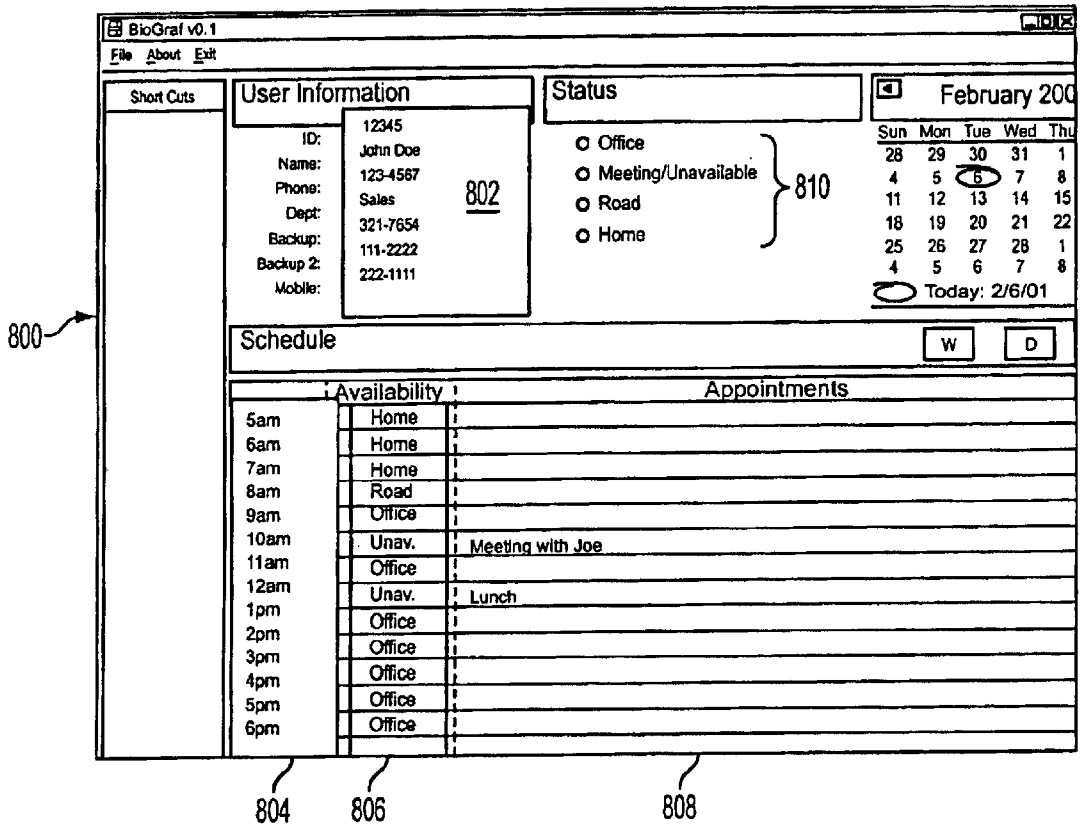
FIG. 11 is a schedule screen of the preferred embodiment.

FIG. 11 illustrates schedule screen 800 for a typical destination, in this example, the destination is a person named "John Doe." Identifying information for the destination can be entered into field 802, including the person's name, ID number, department, and numbers to the person's (destination) various devices, such as a phone number, backup phone numbers, and a mobile phone number. Field 804 lists the times of day in a manner similar to conventional scheduling programs of personal information managers (PIMs). Field 806 lists the availability status of the person in correspondence to each hour of the work day. In the preferred embodiment, the user can select from one of four statuses, Office, Meeting/Unavailable, Road, and Home. Field 808 lists the person's scheduled appointments for the day.

The information in field 808 can be imported from a conventional PIM or other scheduler. Alternatively, the information can be entered directly in field 808 manually, such as when the person uses the preferred embodiment as their primary scheduling tool. The information in field 806 can be culled from information in the PIM or other scheduler or can be entered manually by selecting a time of day or appointment and selecting one of status buttons 810. Further, the status information in field 806 can be generated based on a default template. For example, the person may construct a default template that indicates that they are in the office from 9 am to 5 pm. Commuting, i.e. Road, from 8 am to 9 am and from 5 pm to 6 pm, and home at all other hours. These defaults can be used to populate field 806 and can be overridden when an appointment is entered or a different button 810 is selected. The schedule information permits the preferred embodiment to direct the a call routed to a destination to a particular device associated with that destination based on the destination schedule. The term "schedule" as used herein refers broadly to the status of a destination with respect to time.

Figure 12:
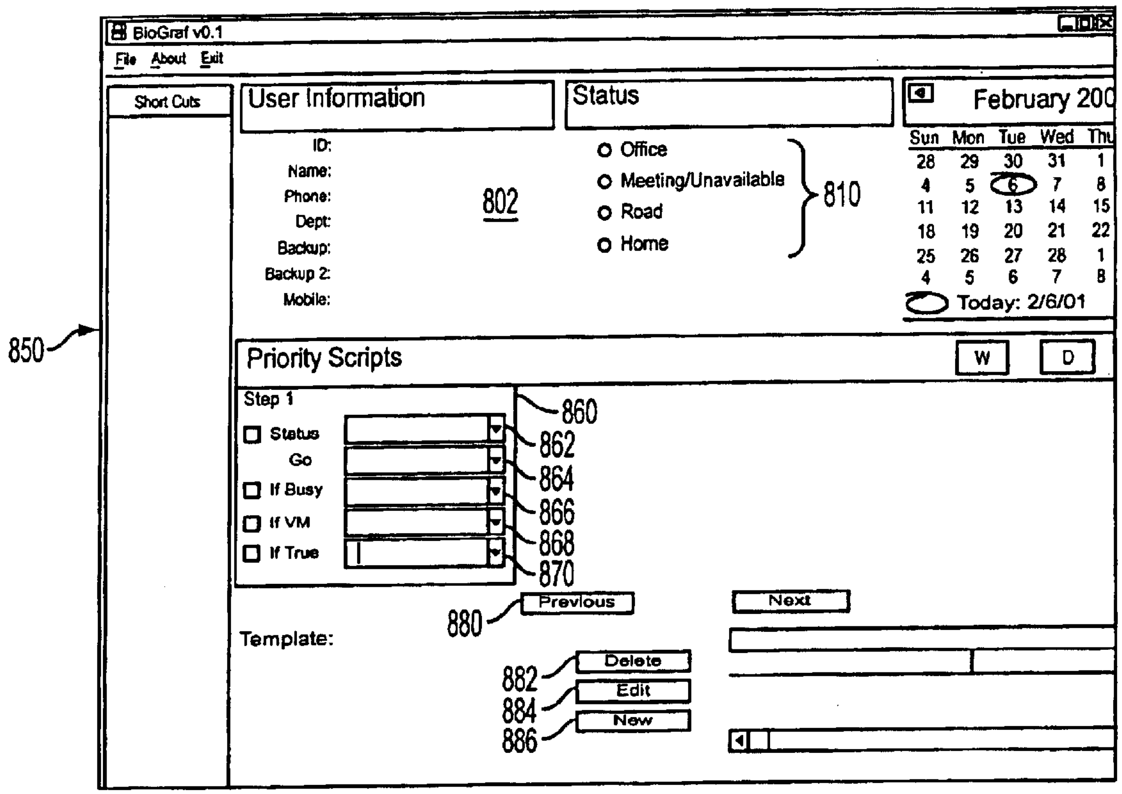
FIG. 12 is a device scripting screen of the preferred embodiment.

FIG. 12 illustrates device scripting screen 850 for creating automated scripts for directing calls to one or more of plural devices associated with the destination. Scripting box 860 includes one or more fields, drop down menus 862 through 870 in the preferred embodiment, for associating conditions with various devices. For example, the user can select a status (Home, Office, Meeting/Unavailable, or Road) from drop down menu 862 and a primary device, such as their phone in drop down menu 864. In such a case, when the destination schedule, such as that illustrated in FIG. 11, shows the selected status, all calls routed to that destination will be directed to the phone. Further, drop down menus 866, 868, and 870 can be used to select an alternate destination if the primary destination is busy, if voicemail picks up, or If True. For example, if the destination primary line is busy and the call is directed to voicemail, the user may want to be notified on another device, such as a pager or email. The "If True" menu permits another specified action to be taken if the command selected in the "60" menu completes successfully, i.e., the line was not busy and voice mail did not pick-up. The computer can be accessible remotely, such as through telephony or over the Internet, to permit rule changes, destination changes, and device changes. Keywords can be assigned to destinations to permit location of the appropriate destination through a word search.

One of the selections in each drop down menu can be "go to step no. xx", where "xx" is a step number. A plurality of scripts, i.e. steps, can be constructed to provide a great deal of call direction flexibility. Each script can be created in the manner described above. Buttons 880 through 888 can be used to navigate through a plurality of scripts to view and edit the scripts.

The invention provides organizational knowledge of and control over the call answering function. An intelligent and preplanned system can be constructed and evolved through rules. A receptionist need not have a great deal of experience or training to handle calls efficiently and effectively.

It can be seen that the preferred embodiment permits a receptionist with minimal training to determine the content of a call by assigning values to call characteristics. Rules can be defined for routing a call based on the assigned values. Further, the preferred embodiment is transparent to callers. The invention can be implemented on any type of computer, such as a personal computer, a mini computer, or via a computer system, such as a client server architecture. Any type of interface can be used to collect data and the data can be stored in any format or manner. The invention can be used for a single organization, part of an organization, or for handling all calls for plural organizations. The classification method can be used for managing any type of communication. For example, the invention can be used to classify, and/or route facsimile messages or other printed documents, electronic mail messages, instant electronic messages, or any other human readable or computer readable communication. The various procedures of the invention can be accomplished through automated means or by a human. For example, a textual communication can be read by a receptionist and the content thereof can be used for selecting values or the same communication can be scanned and parsed by a computer and values can be assigned automatically. Routing of communications can be accomplished over electronic channels or through physical transportation of the communication.

The invention provides organizational knowledge of and control over the communication management function. An intelligent and preplanned system can be constructed and evolved through rules. A receptionist need not have a great deal of experience or training to handle communications efficiently and effectively.

The invention has been described through a preferred embodiment. However, the embodiment is not intended to be limiting to the scope of the invention as defined by the appended claims and legal equivalents.

What is claimed is:

1. A method for managing communications comprising the steps of:

receiving a communication having content for an unknown destination;

displaying and assigning one or more of a plurality of values from a predetermined value set to each of one or more of a plurality of predetermined characteristics corresponding respectively to the value sets and relating to the content of the communication;

selecting a destination base on the values assigned in said assignment step; and transferring the communication to the destination selected in said selecting step.

2. The method as recited in claim 1, wherein said transferring step further comprises: routing the communication to a specified device of the destination based on predetermined scripts relating to a schedule of the destination.

3. The method as recited in claim 2, wherein said routing rules comprise a workflow process of the destination based on the content of the communication.

4. A method as recited in claim 1, wherein said selecting step comprises applying the values to one or more predefined rules, determining one of said rules that corresponds to the values, and determining a destination of said one of said rules.

5. The method as recited in claim 1, wherein said assigning step comprises: prompting an operator to select one or more values for each characteristic.

6. The method as recited in claim 1, further comprising the steps of: generating a plain-language statement based on the values assigned in said assigning step; and displaying the plain-language statement.

7. The method as recited in claim 6 further comprising the steps of: assigning one or more devices to the destination; inputting schedule data for the destination to create a script; and wherein said transferring step further comprises, transferring the communication to one or more of the devices based on the script.

8. The method as recited in claim 7 wherein the devices comprise at least one of a phone, a facsimile machine, a voice mail system, an e-mail system, and a pager.

9. The method as recited in claim 7 wherein said inputting step comprises importing from an external scheduling system.

10. The method as recited in claim 1, wherein said step of assigning comprises assigning one or more of a plurality of predetermined values to a characteristic of subject.

11. The method as recited in claim 10, wherein the predetermined values are “product/service”, “money”, “people”, and “facilities.”

12. The method as recited in claim 1, wherein said step of assigning comprises assigning one or more of a plurality of predetermined values to a characteristic of status.

13. The method as recited in claim 12, wherein the predetermined values are “prospect” and “established.”

14. The method as recited in claim 1, wherein said step of assigning comprises assigning one or more of a plurality of predetermined values to a characteristic of class.

15. The method as recited in claim 14, wherein the predetermined values are “customer”, “vendor”, “employee”, “fire/police”, “government”, “investor” and “media.”

16. The method as recited in claim 1, wherein said step of assigning comprises assigning one or more of a plurality of predetermined values to a characteristic of priority.

17. The method as recited in claim 16, wherein the predetermined values are “normal”, “complain”, and “emergency.”

18. The method as recited in claim 1, wherein said step of assigning comprises assigning one or more of a plurality of predetermined values to a characteristic of transaction direction.

19. The method as recited in claim 18, wherein the predetermined values are “receiving”, “delivering”, “internal”, and “external.”

20. The method as recited in claim 1, wherein said step of assigning comprises assigning one or more of a plurality of predetermined values to a characteristic of transaction control.

21. The method as recited in claim 20, wherein the predetermined values are “begin”, “end”, and “change.”

22. The method as recited in claim 1, wherein said step of assigning comprises assigning one or more of a plurality of predetermined values to a characteristic of action.

23. The method as recited in claim 22, wherein the predetermined values are “buy”, “information”, “repair”, “schedule”, and “pay.”

24. The method as recited in claim 1, wherein said call destination includes a link and further comprising opening an application corresponding to the link.

25. A method as recited in claim 1, wherein said transferring step comprises physically transporting the communication to the destination.

26. A method as recited in claim 1, wherein said transferring step comprises coupling the communication to the destination through electronic communication channels.

27. The method as recited in claim 26, wherein said step of assigning comprises assigning one or more of a plurality of predetermined values to a characteristic of subject.

28. The method as recited in claim 27, wherein the predetermined values are “product/service ”, “money”, “people”, and “facilities.”

29. A method for classifying a communication having content when the destination is unknown comprising:

analyzing the content of the communication for selecting a destination;

applying the content of the communication to a characteristic matrix representing the content;

presenting and assigning a predetermined value to each characteristic in the matrix based on the content of the communication, the assignment of predetermined values forming a particular matrix structure;

classifying the communication by selecting a destination based on the structure of the matrix.

30. The method as recited in claim 29, wherein said step of assigning comprises assigning one or more of a plurality of predetermined values to a characteristic of status.

31. The method as recited in claim 30, wherein the predetermined values are “prospect” and “established.”

32. The method as recited in claim 29, wherein said step of assigning comprises assigning one or more of a plurality of predetermined values to a characteristic of transaction direction.

33. The method as recited in claim 32, wherein the predetermined values are “receiving”, “delivering”, “internal”, and “external.”

34. The method as recited in claim 29, wherein said classifying step comprises applying the matrix having values to one or more predefined rules, determining one of said rules that corresponds to the matrix, and determining a classification of said one of rules.

35. The method as recited in claim 29, wherein said step of assigning comprises assigning one or more of a plurality of predetermined values to a characteristic of class.

36. The method as recited in claim 35 wherein the predetermined values are “customer”, “vendor”, “employee”, “fire/police”, “government”, “investor” and “media”.

37. The method as recited in claim 29, wherein said step of assigning comprises assigning one or more of a plurality of predetermined values to a characteristic of priority.

38. The method as recited in claim 37, wherein the predetermined values are “normal”, “complain”, and “emergency.”

39. The method as recited in claim 29, wherein said step of assigning comprises assigning one or more of a plurality of predetermined values to a characteristic of transaction control.

40. The method as recited in claim 39, wherein the predetermined values are "begin", "end", and "change."

41. The method as recited in claim 29, wherein said step of assigning comprises assigning one or more of a plurality of predetermined values to a characteristic of action.

42. The method as recited in claim 41, wherein the predetermined values are "buy", "information", "repair", "schedule", and "pay."

43. A computer readable media having instructions recorded thereon for managing communications having content, said instructions comprising:

instructions for displaying and prompting a user to assign one or more of a plurality of predetermined values from a predetermined value set to each of one or more of a plurality of predetermined characteristics corresponding respectively to the value sets and relating to the content of a received communication for an unknown destination;

instructions for selecting a destination based on the values assigned in said assignment step; and instructions for transferring the communication to the destination.

44. The media as recited in claim 43, wherein said instructions for transferring further comprise instructions for routing the communication to a specified device of the destination based on predetermined scripts relating to the schedule of the destination.

45. The method as recited in claim 44; wherein said routing rules comprise a workflow process of the destination based on the content of the communication.

46. The media as recited in claim 43, wherein said instructions for selecting comprise instructions for applying the values to one or more predefined rules, instructions for determining one of said rules that corresponds to the values, and instructions for determining a call destination of said one of said rules.

47. The media as recited in claim 43, wherein said instructions for prompting comprise instructions for prompting a user to assign one or more of a plurality of predetermined values to a characteristic of status.

48. The media as recited in claim 47, wherein the predetermined values are "prospect" and "established."

49. The media as recited in claim 43, further comprising instructions for generating a plain-language statement based on the assigned values and instructions for displaying the plain-language statement.

50. The media as recited in claim 43, wherein said instructions for prompting comprise instructions for prompting a user to assign one or more of a plurality of predetermined values to a characteristic of class.

51. The media as recited in claim 50, wherein the predetermined values are "customer", "vendor", "employee", "fire/police", "government", "investor" and "media."

52. The media as recited in claim 43, wherein said instructions for prompting comprise instructions for prompting a user to assign one or more of a plurality of predetermined values to a characteristic of transaction direction.

53. The media as recited in claim 52, wherein the predetermined values are "receiving", "delivering", "internal", and "external."

54. The media as recited in claim 43, wherein said instructions for prompting comprise instructions for prompting a user to assign one or more of a plurality of predetermined values to a characteristic of priority.

55. The media as recited in claim 54, wherein the predetermined values are "normal", "complain", and "emergency."

56. The media as recited in claim 43, wherein said instructions for prompting comprise instructions for prompting a user to assign one or more of a plurality of predetermined values to a characteristic of subject.

57. The media as recited in claim 56, wherein the predetermined values are "product/service", "money", "people", and "facilities."

58. The media as recited in claim 43, wherein said instructions for prompting comprise instructions for prompting a user to assign one or more of a plurality of predetermined values to a characteristic of transaction control.

59. The media as recited in claim 58, wherein the predetermined values are "begin", "end", and "change."

60. The media as recited in claim 58, wherein the predetermined values are "buy", "information", "repair", "schedule", and "pay."

61. The media as recited in claim 43, wherein said instructions for prompting comprise instructions for prompting a user to assign one or more of a plurality of predetermined values to a characteristic of action.

62. The media as recited in claim 43, wherein said destination includes a link and further comprising instructions for opening an application corresponding to the link.

63. The media as recited in claim 43, wherein said instructions for transferring comprise instructions for prompting a user to physically transport the communication to the destination.

64. The media as recited in claim 43, wherein said instructions for transferring comprise instructions for coupling the communication to the destination through electronic communication channels.

65. A method of managing communications comprising:

ascertaining a meaning of at least a portion of the communication for an unknown destination;

displaying and applying a translational language to the meaning, the translational language comprising a plurality of predetermined values from a predetermined value set to each of one or more of a plurality of predetermined characteristics corresponding respectively to the value sets and relating to the content of the communication;

selecting a destination based on the results of said applying step; and transferring the communication to the destination.

66. A method as recited in claim 65, wherein said communication is a telephone call and said transferring step comprises connecting the call to a desired device.

67. A method as recited in claim 65, wherein said applying step comprises assigning one or more of a plurality of predetermined values to each of one or more of a plurality of predetermined characteristics relating to the communication.

68. A method for managing communications by applying a translational language to the communication to determine a destination for the communication, said method comprising:

determining, before receiving a communication for an unknown destination, a characteristic of a communication to be used in determining a destination for the communication;

determining, before receiving a communication for an unknown destination, a set of plural values that can be assigned to the characteristic;

receiving a communication having content for an unknown destination;

presenting and assigning at least one of the plural values in the set to the characteristic based on the content of the communication;

selecting a destination based on the at least one value assigned in said assigning step; and transferring the communication to a destination based on the at least one value assigned to the characteristic.

69. The method as recited in claim 68, wherein said selecting step comprises applying the values to one or more predefined rules, that correspond to said values and determining a call destination based on said one of said rules.

70. The method as recited in claim 66, further comprising the steps of:

assigning one or more devices to the destination;

inputting schedule data for a user associated with the destination; and in said transferring step, transferring the call to one or more of the devices based on the schedule data.

71. The method as recited in claim 70, further comprising the steps of:

assigning one or more devices to the destination;

inputting schedule data for a user associated with the destination; and in said transferring step, transferring the call to one or more of the devices based on the scheduling data.

72. The method as recited in claim 71 wherein said devices comprise of at least one of a phone, a facsimile machine, a voice mail system, and e-mail system and a pager.

73. The method recited claim 71 wherein the schedule data is imported from an external scheduling system.

74. The method as recited in claim 71, wherein said transferring step further comprises applying predetermined routing rules to said schedule data to determine a device of said destination to which the call should be transferred, wherein said routing rules comprise a workflow of the destination based on the content of the call.

75. The method as recited in claim 68, wherein said transferring step further comprises:

routing the call to a specified device of the destination based on predetermined routing rules relating to the destination.

76. The method as recited in claim 75, wherein said routing rules comprise a workflow process of the destination based on the content of the communication.

77. The method as recited in claim 68, wherein said assigning step comprises:

prompting an operator to select one or more values for each characteristic.

78. A method for setting up a system for managing communications by applying a translational language to the communication to determine a destination for the communication, said method comprising:

determining at least one presentable characteristic of a communication for an unknown destination to be used in determining a destination for the communication;

determining a set of presentable plural values that can be assigned to the characteristic;

determining at least one rule correlating a value of the characteristic to a destination for communications having content associated with the value.

79. A method for managing communications using a translational language to synthesize the content of a communication into a reduced set of elements, said method comprising the steps of:

receiving a communication having content for an unknown destination;

determining a list of elements relating to the communication's content, said list comprising plural elements;

displaying and applying a logical polysemy expression to the list of elements to express the content of the communication;

using the logical polysemous expression to determine the destination of the communication; and transferring the communication to the destination.

80. The method as recited in claim 79, wherein each of said elements are values selected from a predetermined set of values corresponding to a characteristic.

81. The method as recited in claim 79, wherein said applying step comprises applying at least one predetermined rule to the list of elements.

82. The method as recited in claim 79, wherein said applying step comprising applying rules based on the elements and the context of the elements in the list of elements.

83. The method as recited in claim 79, wherein said determining step comprises a human selecting values through a computer user interface and said applying step comprises applying a computer polysemy algorithm.

84. A system for managing communications by applying a translational language to the communication to determine a destination for the communication, comprising:

an interface for displaying and determining at least one characteristic of a communication for an unknown destination to be used in determining a destination for the communication;

an interface for displaying and selecting at least one value from a set of predetermined plural values that can be assigned to the characteristic; and an interface for determining at least one rule correlating the at least one selected value of the characteristic to a destination for communications having content associated with the value.

85. A method for setting up a system for managing communications by applying a translational language to the communication to determine a destination for the communication, comprising:

displaying and determining at least one characteristic of a communication for an unknown destination to be used in determining a destination for the communication;

displaying and selecting at least one value from a set of predetermined plural values that can be assigned to the at least one characteristic; and determining at least one rule correlating the at least one selected value of the at least one characteristic to a destination for communications having content associated with the value.

* * * * *